US009767311B2

(12) United States Patent
Lin et al.

(10) Patent No.: US 9,767,311 B2
(45) Date of Patent: Sep. 19, 2017

(54) STACK ISOLATION BY A STORAGE NETWORK SWITCH

(71) Applicant: NetApp, Inc., Sunnyvale, CA (US)

(72) Inventors: James Lin, Mountain View, CA (US); Wayne Booth, Sunnyvale, CA (US); Radek Aster, Campbell, CA (US); John Fabrizio Bevilacqua, San Ramon, CA (US); Timothy Vincent Lee, Cary, NC (US)

(73) Assignee: NetApp, Inc., Sunnyvale, CA (US)

( * ) Notice: Subject to any disclaimer, the term of this patent is extended or adjusted under 35 U.S.C. 154(b) by 394 days.

(21) Appl. No.: 14/063,998

(22) Filed: Oct. 25, 2013

(65) Prior Publication Data

US 2015/0120779 A1    Apr. 30, 2015

(51) Int. Cl.
*G06F 21/62* (2013.01)
*H04L 29/08* (2006.01)

(52) U.S. Cl.
CPC ...... *G06F 21/6227* (2013.01); *H04L 67/1095* (2013.01)

(58) Field of Classification Search
CPC . G06F 21/6218; G06F 21/6227; G06F 21/604
USPC ........................................ 707/782, 783, 786
See application file for complete search history.

(56) References Cited

U.S. PATENT DOCUMENTS

| 7,437,462 B2 * | 10/2008 | Marks | G06F 3/0605 709/224 |
| 2011/0107002 A1 * | 5/2011 | Jones | G06F 13/4027 710/312 |
| 2012/0173840 A1 * | 7/2012 | Patel | G06F 13/4022 711/202 |
| 2014/0122751 A1 * | 5/2014 | Myrah | G06F 11/0727 710/16 |

OTHER PUBLICATIONS

International Search Report and Written Opinion for Application No. PCT/US2014/062053 mailed on Jan. 28, 2015, 9 pages.

\* cited by examiner

*Primary Examiner* — Rehana Perveen
*Assistant Examiner* — Loc Tran
(74) *Attorney, Agent, or Firm* — LeClairRyan, a Professional Corporation

(57) ABSTRACT

Technology is disclosed for stack isolation in a storage system including a storage network switch and multiple storage sub-systems (e.g., storage stacks). The storage network switch includes multiple ports and at least one of the ports is configured to dynamically connect to a device that can be either a storage controller device or a storage sub-system. The technology can receive an identification message indicating that a device is connected to a port of a storage network switch, determine based on the identification message at the storage network switch whether the device is a storage controller device or a storage sub-system, and transfer messages between the ports of the storage network switch such that the storage network switch pre- (Continued)

vents communications between storage sub-systems connected to the storage network switch, but allows communications between the storage sub-systems and storage controller devices connected to the storage network switch.

27 Claims, 8 Drawing Sheets

STACK ISOLATION BY A STORAGE NETWORK SWITCH

BACKGROUND

In storage technology, a storage server (or "storage system") is a processing system that provides one or more storage clients with access (e.g., read and write access) to a mass storage facility over a network. Such a system is called a network storage system. In other words, a storage server is adapted to store and retrieve data on behalf of one or more client processing systems ("clients" or "hosts") in response to requests received from the hosts. At least some storage servers can provide clients with both file-level access and block-level access to data stored in storage devices (e.g., disks, solid-state drives, etc.). For convenience, a storage server will be described herein, for the most part, in terms of storage devices that provide file-level access, although the description herein also has application to storage systems that provide block-level access, as will be apparent to those of ordinary skill in the art. Examples of such storage servers include a file server or another type of computing device that provides storage services using a file system to respond to file-oriented data access requests ("filer"). A storage server includes a storage operating system that implements a file system to logically organize the information as a hierarchical structure of directories and files on the storage devices. A "file system" as discussed herein is a structured set of logical containers of data, which may be, but are not necessarily, in the form of files, directories, logical units and/or other type(s) of logical containers. Each file stored on a disk or other type of storage device may be implemented as a set of data structures, e.g., disk blocks, that are configured to store information.

The storage server can include a storage sub-system that may include a storage stack containing multiple hardware and software components. For example, a typical storage stack may include multiple storage shelves. The storage shelves can contain multiple mass storage devices, e.g., magnetic hard drives, solid state drives, tape data storage, or other data storage devices. The storage shelves can be connected in a linear chain fashion. However, the number of shelves in the storage stack (the "depth") is limited to approximately 10, due to the exponential increase of data access latency as the depth increases. The deeper a storage shelf is in the linear chain, the exponentially larger the data access latency generally is. Therefore, the storage size of the storage system is limited by the number of shelves in the storage stack and the number of mass storage devices in each storage shelf.

BRIEF DESCRIPTION OF THE DRAWINGS

Objects, features and characteristics of the disclosed technology will become more apparent to those skilled in the art from a study of the following detailed description in conjunction with the appended claims and drawings, all of which form a part of this specification. In the drawings:

DETAILED DESCRIPTION

Figure 1:
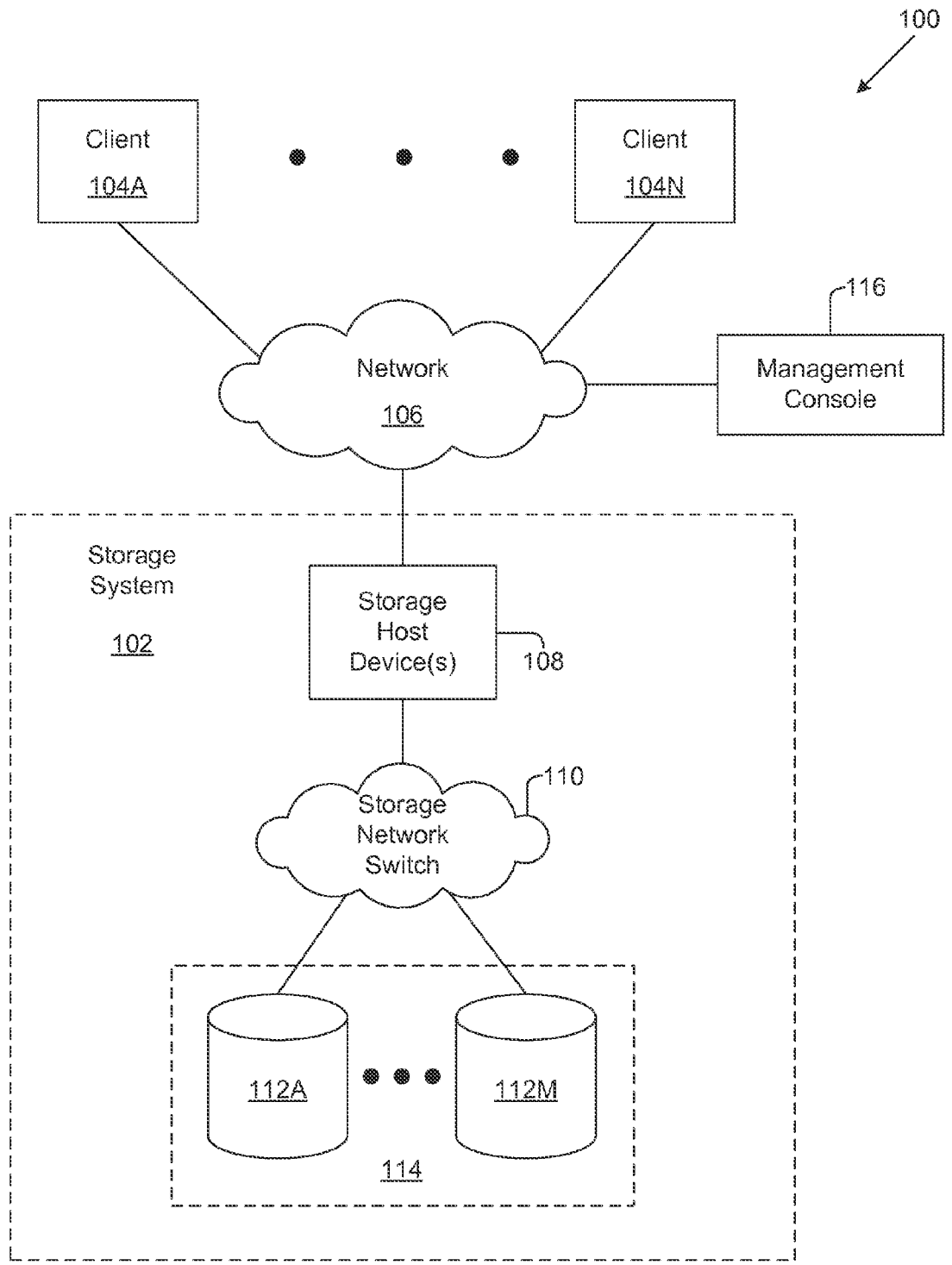
FIG. 1 is a block diagram illustrating a network storage environment, in which the technology can operate in various embodiments.

References in this specification to "an embodiment," "one embodiment," or the like, mean that the particular feature, structure, or characteristic being described is included in at least one embodiment of the disclosed technology. Occurrences of such phrases in this specification do not all necessarily refer to the same embodiment or all embodiments, however.

Technology for providing storage stack isolation by a storage network switch is disclosed herein ("the technology"). The technology enables multiple storage stacks in a storage system to be interconnected via the storage network switch. Such a storage system configuration can contain thousands of mass storage devices that form a single Serial Attached SCSI ("SAS") domain. The storage network switch enforces the stack isolation by preventing communications between the storage stacks. In various embodiments, the storage network switch may prevent communications between storage controller devices connected to the storage network switch. Any topology update message generated by a storage stack will propagate within the storage system but not with other stacks connected to the same storage network switch. The storage system can have one or more expanders. An expander (e.g., an SAS expander) is a device that facilitates communication between large numbers of devices. Similar to a switch in a network, an expander allows a single initiating device to communicate with multiple targeting devices The expander of a storage stack can have a routing table size significantly less than a routing table size of the storage network switch. As a result, the storage stacks can include relatively inexpensive expanders that do not need to maintain routing information for mass storage devices of other storage stacks. This can reduce costs of storage stacks because the high speed memories in the expanders and the switch for storing and accessing routing tables are costly hardware components.

In various embodiments, the technology includes a storage system having a storage network switch, multiple storage stacks, and multiple storage controller devices. The storage network switch is designed to interconnect the storage stacks and storage controller devices to form the storage system in a single Serial Attached SCSI (SAS) domain. The storage network switch includes multiple ports and a memory. At least one of the ports is capable of dynamically connecting to one of a storage controller device or a storage stack. In various embodiments, any port of a storage network switch is capable of dynamically connecting to storage controller devices or storage stacks. The memory is configured to store a routing table, which contains network routes to mass storage devices of the storage stacks. Storage controller devices handle data access requests received from clients, and can access the storage stacks via the storage network switch. At least one storage stack includes one or more storage shelves. In various embodiments, a storage shelf can contain one or more expanders. The storage shelves are connected to each other in a daisy chain scheme. At least one of the storage shelves includes multiple mass storage devices. The expander stores a routing table that contains routing information for mass storage devices of that individual storage stack, but does not need to contain routing information for mass storage devices of other storage stacks. In various embodiments, each expander can store a routing table. As a result, the expander can have a routing table size significantly less than the routing table size of the storage network switch.

The storage network switch is configured to dynamically identify whether a connected device is a storage controller device or a storage stack, based on an identification message received from the connected device indicating that the device is connected to a designated port of the storage network switch. The storage network switch is further configured to automatically transfer messages between the ports such that the storage network switch prevents communications between storage stacks connected to the storage network switch, but allows communications between the storage stacks and the storage controller devices connected to the storage network switch. The functionalities of the storage network switch can be realized, for example, by executing instructions stored in a firmware of the storage network switch. Therefore, the storage network switch isolates the storage stacks from each other because there can be no communications between the storage stacks.

Several embodiments of the described technology are described in more detail in reference to the Figures. The devices on which the described technology may be implemented may include one or more central processing units, memory, input devices (e.g., keyboard and pointing devices), output devices (e.g., display devices), storage devices (e.g., disk drives), and network devices (e.g., network interfaces). The memory and storage devices are computer-readable media that may store instructions that implement at least portions of the described technology. In addition, the data structures and message structures may be stored or transmitted via a data transmission medium, such as a signal on a communications link. Various communications links may be used, such as the Internet, a local area network, a wide area network, or a point-to-point dial-up connection. Thus, computer-readable media can comprise computer-readable storage media (e.g., "non-transitory" media) and computer-readable transmission media.

System Environment

Figure 2:
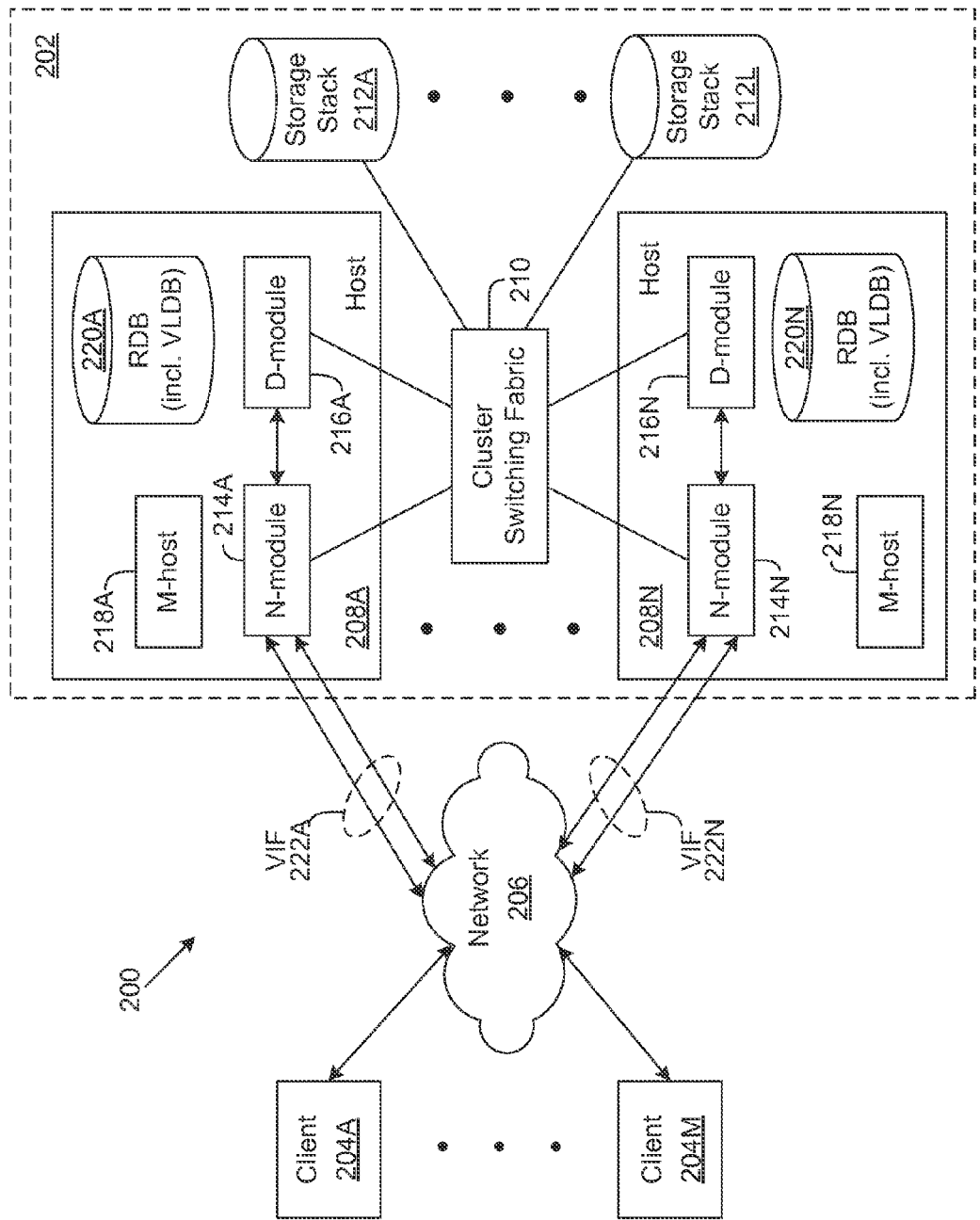
FIG. 2 is a block diagram illustrating a clustered network storage environment, in which the technology can operate in various embodiments.

Turning now to the Figures, FIGS. 1 and 2 illustrate, at different levels of detail, storage environment configurations in which the technology can be implemented. Client computing devices ("clients") are presented with a clustered storage system having multiple mass storage devices that can be managed by multiple storage controller devices. The technology provides a storage system containing multiple storage stacks that together form a single storage group, e.g., a "Serial Attached SCSI (SAS) domain".

Referring to FIG. 1, FIG. 1 is a block diagram illustrating a network storage environment 100, in which the technology can operate in various embodiments. The storage environment 100 includes multiple client computing devices or systems 104A-104N, a storage system 102, and a network 106 connecting the client systems 104A-104N and the storage system 102. As illustrated in FIG. 1, the storage system 102 includes at least one storage host device 108 (e.g. a storage controller device), a storage network switch 110, and one or more mass storage devices 112A-112M, e.g., conventional magnetic disks, optical disks (e.g. CD-ROM or DVD based storage), magneto-optical (MO) storage, tape data storage, flash memory storage device or any other type of non-volatile storage devices suitable for storing structured or unstructured data. The examples disclosed herein may reference a storage device as a "disk" but the embodiments disclosed herein are not limited to disks or any particular type of storage media/device. The mass storage devices 112A-112M may be associated with a mass storage subsystem 114.

The storage host devices (or servers) 108 may be, for example, one of the storage server products available from NetApp, Inc., the assignee of the present application, or available from other vendors. The client systems 104A-104N may access the storage host device 108 via network 106, which can be a packet-switched network, for example, a local area network (LAN), a wide area network (WAN), the Internet, or any other type of network.

The storage host device 108 may be connected to the storage devices 112A-112M via a storage network switch 110, which can be a Serial Attached SCSI (SAS) storage network switch or a fiber distributed data interface (FDDI), for example. It is noted that, within the network data storage environment, any other suitable numbers of storage servers and/or mass storage devices, and/or any other suitable network technologies, may be employed. Although FIG. 1 illustrates, a fully connected storage network switch 110 where storage host devices can access all mass storage devices, it is understood that such a connected topology is not required. In various embodiments, the storage devices can be directly connected to the storage servers such that two storage servers cannot both access a particular storage device concurrently.

The storage host device 108 can make some or all of the storage space on the mass storage devices 112A-112M available to the client systems 104A-104N in a conventional manner. For example, a mass storage device (one of 112A-112M) can be implemented as an individual disk, multiple disks (e.g., a RAID group) or any other suitable mass storage device(s). The storage host device 108 can communicate with the client systems 104A-104N according to well-known protocols, e.g., the Network File System (NFS) protocol or the Common Internet File System (CIFS) protocol, to make data stored at storage devices 112A-112M available to users and/or application programs.

The storage host device 108 can present or export data stored at mass storage device 112A-112M as volumes (also referred to herein as storage volumes) to one or more of the client systems 104A-104N. On or more volumes can be managed as a single Serial Attached SCSI (SAS) domain, for example. In various embodiments, a "file system" does not have to include or be based on "files" per se as its units of data storage.

Various functions and configuration settings of the storage host device 108 and the mass storage subsystem 114 can be controlled from a management console 116 coupled to the network 106.

FIG. 2 is a block diagram illustrating a clustered network storage environment, in which the technology can operate in various embodiments. As illustrated in FIG. 2, a cluster based storage environment 200 includes multiple storage host devices. The storage environment 200 includes multiple client systems 204 (204A-204M), a clustered storage system 202, and a network 206 connecting the client systems 204. As illustrated in FIG. 2, the clustered storage system 202 includes multiple storage host devices (may also be referred to as "nodes," "servers," or "hosts") 208A-208N, a cluster switching fabric 210, and multiple storage stacks 212 (212A-212L). The storage stacks 212A-212L can contain a large number of mass storage devices, that may each be removable.

The hosts 208A-208N can be configured to include several modules, including an N-module 214, a D-module 216, and an M-host 218 (each of which can be implemented by using a separate processor executable module) and an instance of a replicated database (RDB) 220. In the illustrated embodiment, host 208A includes an N-module 214A, a D-module 216A, and an M-host 218A; host 208N includes an N-module 214N, a D-module 216N, and an M-host 218N; and so forth. The N-modules 214A-214N include functionality that enables hosts 208A-208N, respectively, to connect to one or more of the client systems 204 over the network 206, while the D-modules 216A-216N provide access to the data stored at storage devices in storage stacks 212A-212L. The M-hosts 218 provide management functions for the clustered storage system 202 including, e.g., snapshotting, deduplication, and encryption. Accordingly, the hosts 208A-208N in the clustered storage system can provide the functionality of a storage server.

In various embodiments, RDBs 220A-220N are instances of a database that is replicated throughout the cluster, e.g., hosts 208A-208N can include instances of the RDBs 220A-220N. The various instances of the RDBs 220A-220N are updated regularly to bring them into synchronization with each other. The RDBs 220A-220N can provide cluster-wide storage information used by hosts 208A-208N, including a volume location database (VLDB) (not illustrated). The VLDB is a database that indicates the location within the cluster of volumes in the cluster and is used by the hosts 208A-208N to identify the appropriate mass storage devices in storage stacks 212A-212L for any given volume to which access is requested.

A switched virtualization layer including multiple virtual interfaces (VIFs) 222A-222N can be provided between the respective N-modules 214A-214N and the client systems 204A-204M, allowing the storage devices in storage stacks 212A-212L associated with the hosts 208A-208N to be presented to the client systems as a single shared storage pool.

The clustered storage system 202 can be organized into any suitable number of virtual servers (also referred to as "vservers"), in which one or more vservers represent a single storage system namespace with separate network access. In various embodiments, each vserver has a user domain and a security domain that are separate from the user and security domains of other vservers. In some other embodiments, two or more vservers can have a common user domain and a common security domain. Moreover, a vserver can be associated with one or more VIFs 222A-222N and can span one or more physical hosts, each of which can hold one or more VIFs 222A-222N and storage associated with one or more vservers. Client systems can access the data on a vserver from any host of the clustered system, but generally access vservers via the VIFs 222A-222N associated with that vserver. It is noteworthy that the embodiments described herein are not limited to the use of vservers.

The hosts 208A-208N and the storage stacks can be interconnected by a cluster switching fabric 210, which can be embodied as one or more storage network switches, for example. The N-modules 214A-214N and D-modules 216A-214N cooperate to provide highly-scalable storage system architecture implementing various embodiments of the technology. Although an equal number of N-modules and D-modules are illustrated in FIG. 2, there may be different numbers of N-modules and/or D-modules in accordance with various embodiments of the technology described here. For example, there need not be a one-to-one correspondence between the N-modules and D-modules. As such, the description of a node 208A-208N comprising one N-module and one D-module should be understood to be illustrative only.

Figure 3:
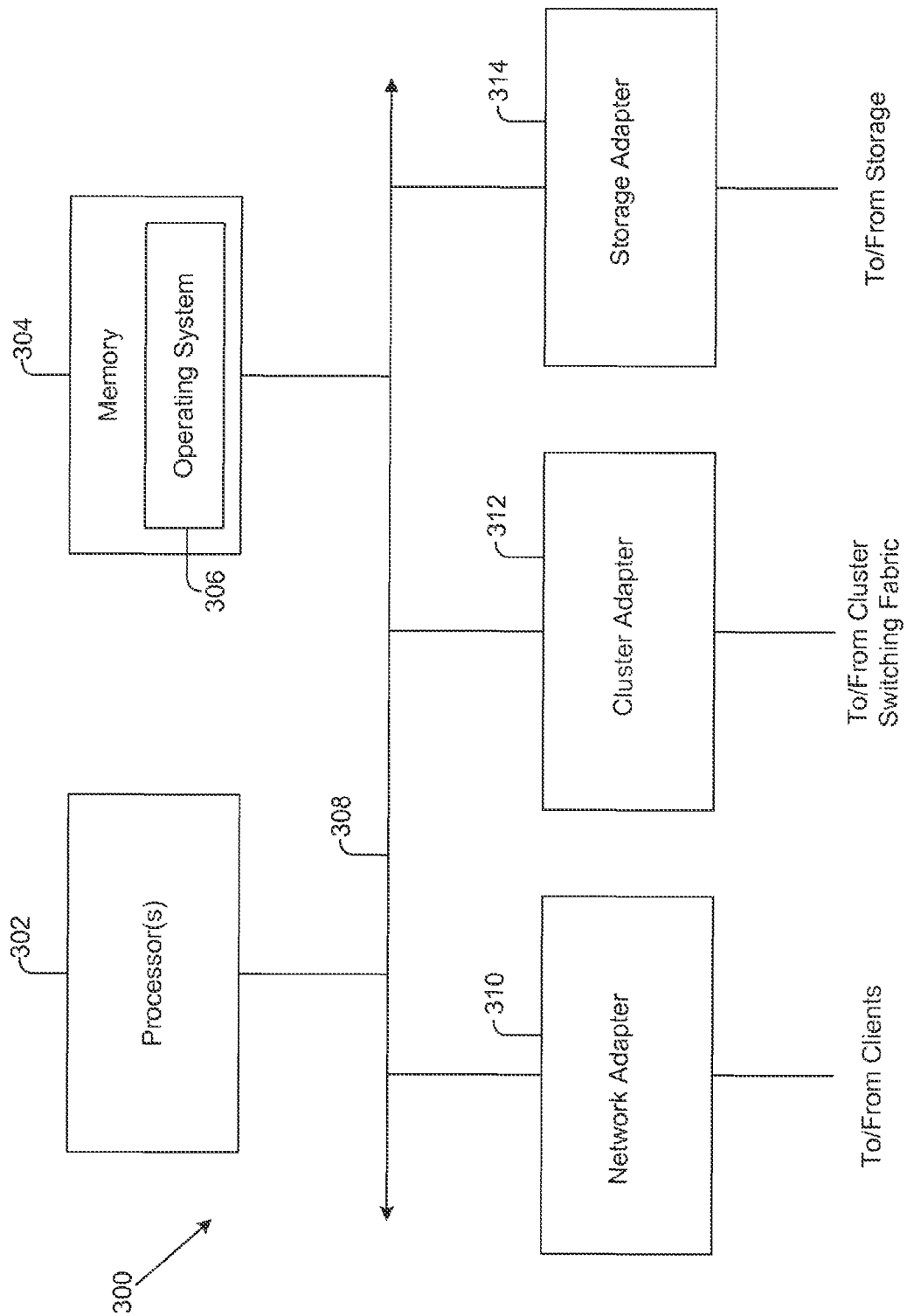
FIG. 3 is a high-level block diagram illustrating an example of hardware architecture of a storage controller that can implement one or more storage host devices, in various embodiments.

FIG. 3 is a high-level block diagram illustrating an example of a hardware architecture of a storage controller 300 that can implement one or more storage host devices 208A-208N, in various embodiments. The storage controller 300 executes some or all of the processor executable process steps that are described below in detail. In various embodiments, the storage controller 300 includes a processor subsystem that includes one or more processors 302. Processor 302 may be or may include, one or more programmable general-purpose or special-purpose microprocessors, digital signal processors (DSPs), programmable controllers, application specific integrated circuits (ASICs), programmable logic devices (PLDs), or the like, or a combination of such hardware based devices.

The storage controller 300 can further include a memory 304, a network adapter 310, a cluster access adapter 312 and a storage adapter 314, all interconnected by an interconnect 308. Interconnect 308 may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other data communication system.

The cluster access adapter 312 includes multiple ports adapted to couple the storage controller 300 to other host devices. In the illustrated embodiment, Ethernet can be used as the clustering protocol and interconnect media, although other types of protocols and interconnects may be utilized within the cluster architecture described herein. In various alternative embodiments where the N-modules and D-modules are implemented on separate storage systems or computers, the cluster access adapter 312 can be utilized by the N-module and/or D-module for communicating with other N-modules and/or D-modules of the cluster.

The storage controller 300 can be embodied as a single- or multi-processor storage system executing a storage operating system 306 that can implement a high-level module, e.g., a storage manager, to logically organize the information as a hierarchical structure of named directories, files and special types of files called virtual disks (hereinafter generally "blocks") at the storage devices. For example, one processor 302 can execute the functions of an N-module on a node while another processor 302 executes the functions of a D-module on the node.

The memory 304 can comprise storage locations that are addressable by the processor(s) 302 and adapters 310, 312, and 314 for storing processor executable code and data structures. The processor 302 and adapters 310, 312, and 314 may, in turn, comprise processing elements and/or logic circuitry configured to execute the software code and manipulate the data structures. The storage operating system 306, portions of which is typically resident in memory and executed by the processors(s) 302, functionally organizes the storage controller 300 by (among other things) configuring the processor(s) 302 to invoke storage operations in support of the storage service provided by a node. It will be apparent to those skilled in the art that other processing and memory implementations, including various computer readable storage media, may be used for storing and executing program instructions pertaining to the technology.

The network adapter 310 can include multiple ports to couple the storage controller 300 to one or more clients over point-to-point links, wide area networks, virtual private networks implemented over a public network (e.g. the Internet) or a shared local area network. The network adapter 310 thus can include the mechanical, electrical and signaling circuitry needed to connect the storage controller 300 to the network. Illustratively, the network can be embodied as an Ethernet network or a Fibre Channel (FC) network. A client can communicate with a node over the network by exchanging discrete frames or packets of data according to pre-defined protocols, e.g., TCP/IP.

The storage adapter 314 can cooperate with the storage operating system 306 to access information requested by a client. The information may be stored on any type of attached array of writable storage media, e.g., magnetic disk or tape, optical disk (e.g., CD-ROM or DVD), flash memory, solid-state disk (SSD), electronic random access memory (RAM), micro-electro mechanical and/or any other similar media adapted to store information, including data and parity information. For example, as illustrated in FIG. 2, the information can be stored on mass storage devices in storage stacks 212A-212L. The storage adapter 314 can include multiple ports having input/output (I/O) interface circuitry that couples to the disks over an I/O interconnect arrangement, e.g., a conventional high-performance, Fibre Channel (FC) link topology. In various embodiments, the cluster adapter 312 and the storage adapter 314 can be implemented as one adaptor configured to connect to a switching fabric, e.g., a storage network switch, in order to communicate with other host devices and the mass storage devices.

Storage of information on mass storage devices in storage stacks 212A-212L can be implemented as one or more storage volumes that include a collection of physical storage disks cooperating to define an overall logical arrangement of volume block number (VBN) space on the volume(s). The mass storage devices in storage stacks 212A-212L can be organized as a RAID group. One or more RAID groups can form an aggregate. An aggregate can contain one or more volumes and/or file systems.

Figure 4:
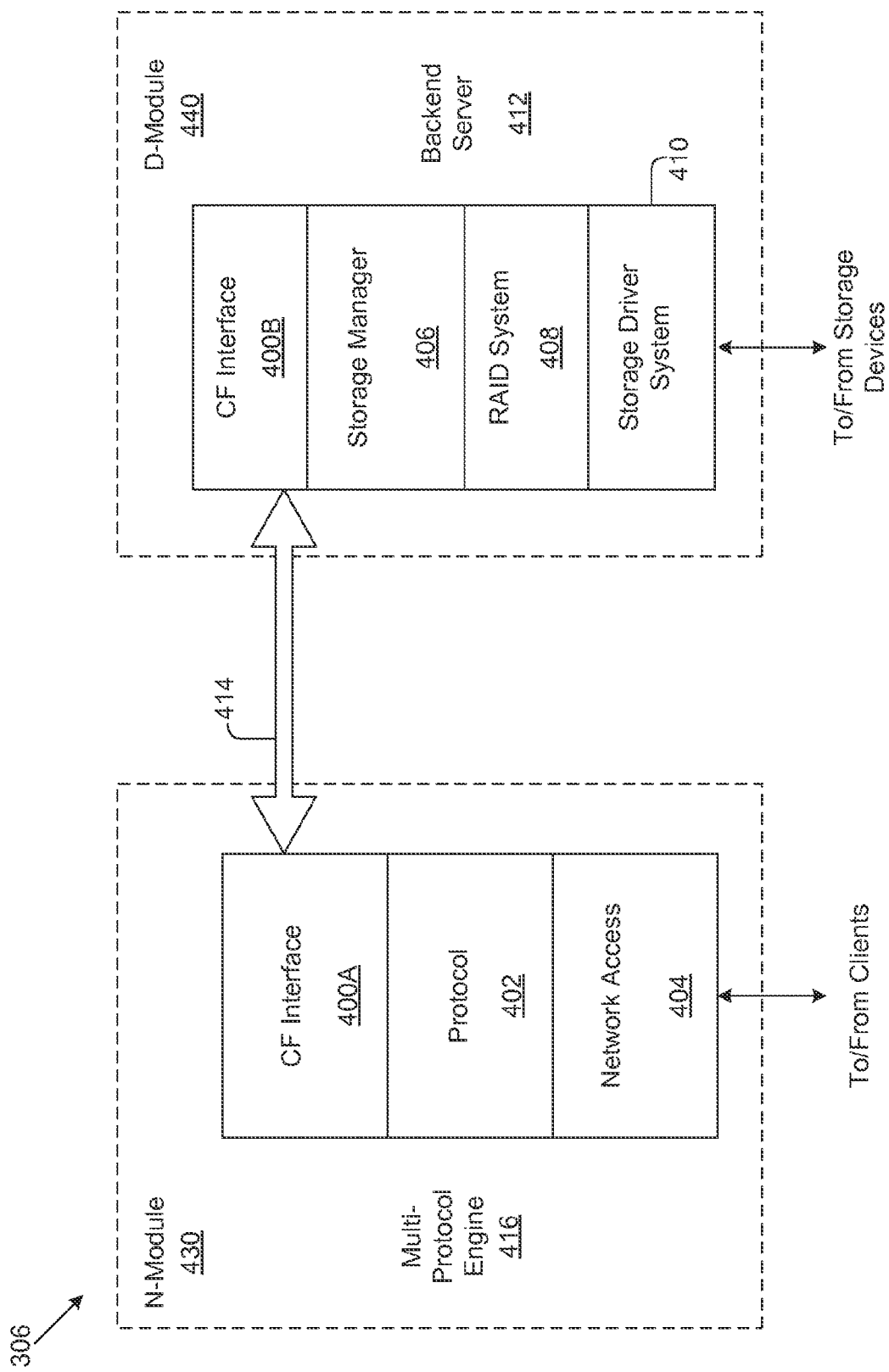
FIG. 4 is a block diagram illustrating an example of a storage operating system of a storage host device, in which the technology can be implemented in various embodiments.

The storage operating system 306 facilitates clients' access to data stored on the storage devices. In various embodiments, the storage operating system 306 implements a write-anywhere file system that cooperates with one or more virtualization modules to "virtualize" the storage space provided by storage devices. For example, a storage manager (e.g. as illustrated in FIG. 4 and described in further detail below) can logically organize the information as a hierarchical structure of named directories and files on the storage devices. An "on-disk" file may be implemented as set of disk blocks configured to store information, e.g., data, whereas the directory may be implemented as a specially formatted file in which names and links to other files and directories are stored. The virtualization module(s) allow the storage manager to further logically organize information as a hierarchical structure of blocks on the disks that are exported as named logical unit numbers (LUNs). In various embodiments, the storage manager of the storage operating system 306 can implement a file system using a "write anywhere file layout" technology, e.g., NetApp's WAFL® technology.

FIG. 4 is a block diagram illustrating an example of a storage operating system 306 of a storage host device, in which the technology can be implemented in various embodiments. The storage operating system 306 may be used to maintain various data structures for providing access to the stored data.

In the illustrated embodiment, the storage operating system 306 includes multiple functional layers organized to form an integrated network protocol stack or, more generally, a multi-protocol engine 416 that provides data paths for clients to access information stored on the mass storage devices using block and file access protocols. The multi-protocol engine 416 in combination with underlying processing hardware also forms an N-module 430. The multi-protocol engine 416 includes a network access layer 404 that includes one or more network drivers that implement one or more lower-level protocols to enable the processing system to communicate over the network 206, e.g., Ethernet, Internet Protocol (IP), Transport Control Protocol/Internet Protocol (TCP/IP), Fibre Channel Protocol (FCP) and/or User Datagram Protocol/Internet Protocol (UDP/IP). The multi-protocol engine 416 can also include a protocol layer 402 that implements various higher-level network protocols, e.g., Network File System (NFS), Common Internet File System (CIFS), Hypertext Transfer Protocol (HTTP), Internet small computer system interface (iSCSI), etc. Further, the multi-protocol engine 416 can include a cluster fabric (CF) interface module 400A that implements intra-cluster communication with other D-modules and/or N-modules.

In addition, the storage operating system 306 includes a set of layers organized to form a backend server 412 that provides data paths for accessing information stored on the storage devices in storage stacks. The backend server 412 in combination with underlying processing hardware also forms a D-module 440. To that end, the backend server 412 includes a storage manager module 406 that can manage a number of storage volumes, a RAID system module 408 and a storage driver system module 410.

The storage manager 406 can manage a file system (or multiple file systems) and serve client-initiated read and write requests. The RAID system 408 manages the storage and retrieval of information to and from the volumes/disks in accordance with a RAID redundancy protocol, e.g., RAID-4, RAID-5, or RAID-DP, while the storage driver system 410 implements a disk access protocol e.g., SCSI protocol, Serial Attached SCSI (SAS) protocol or FCP.

The backend server 412 also includes a CF interface module 400B to implement intra-cluster communication 414 with other N-modules and/or D-modules. In various embodiments, the CF interface modules 400A and 400B can cooperate to provide a single domain across the storage system. Thus, a network port of an N-module that receives a client request can access any data within the single domain located on any mass storage device in any storage stack.

The CF interface modules 400A and 400B implement the CF protocol to communicate file system commands among the modules of cluster over the cluster switching fabric (e.g. 210 in FIG. 2). Such communication can be effected by a D-module exposing a CF application programming interface (API) to which an N-module (or another D-module) issues calls. To that end, a CF interface module can be organized as a CF encoder/decoder. The CF encoder of, e.g., CF interface 400A on N-module 430 can encapsulate a CF message as (i) a local procedure call (LPC) when communicating a file system command to a D-module 440 residing on the same node or (ii) a remote procedure call (RPC) when communicating the command to a D-module residing on a remote node of the cluster. The CF decoder of CF interface 400B on D-module 440 can de-encapsulate the CF message and process the file system command.

In operation of a storage host device, a request from a client can be forwarded as a packet over a network to the node, where it is received at a network adapter (e.g. 310 in FIG. 3). A network driver of layer 404 processes the packet and, if appropriate, passes it on to a network protocol and file access layer for additional processing prior to forwarding to the storage manager 406. The storage manager 406 can then generate operations to load (e.g. retrieve) the requested data from storage device if it is not resident in the memory of the node. If the information is not in the memory, the storage manager 406 can index into a metadata file to access an appropriate entry and retrieve a logical virtual block number (VBN). The storage manager 406 can then pass a message structure including the logical VBN to the RAID system 408; the logical VBN can then be mapped to a disk identifier and disk block number (DBN) and sent to an appropriate driver (e.g. SCSI) of the storage driver system 410. The storage driver can access the DBN from the specified storage device 212 and loads the requested data block(s) in memory for processing by the node. Upon completion of the request, the node (and operating system) can return a reply to the client over the network.

The data request/response "path" through the storage operating system 306 as described above can be implemented in general-purpose programmable hardware executing the storage operating system 306 as software or firmware. Alternatively, it can be implemented at least partially in specially designed hardware. That is, in an alternate embodiment of the technology, some or all of the storage operating system 306 is implemented as logic circuitry embodied within a field programmable gate array (FPGA) or an application specific integrated circuit (ASIC), for example.

The N-module 430 and D-module 440 can be implemented as processing hardware configured by separately-scheduled processes of storage operating system 306. However, in an alternate embodiment, the modules may be implemented as processing hardware configured by code within a single operating system process. Communication between an N-module 430 and a D-module 440 can thus be effected through the use of a message passing between the modules although, in the case of remote communication between an N-module and D-module of different nodes, such message passing occurs over a cluster switching fabric. The message-passing mechanism provided by the storage operating system to transfer information between modules (processes) can be the Inter Process Communication (IPC) mechanism. The protocol used with the IPC mechanism is illustratively a generic file and/or block-based "agnostic" CF protocol that comprises a collection of methods/functions constituting a CF API.

Architecture of Storage System Including Storage Stacks

Figure 5:
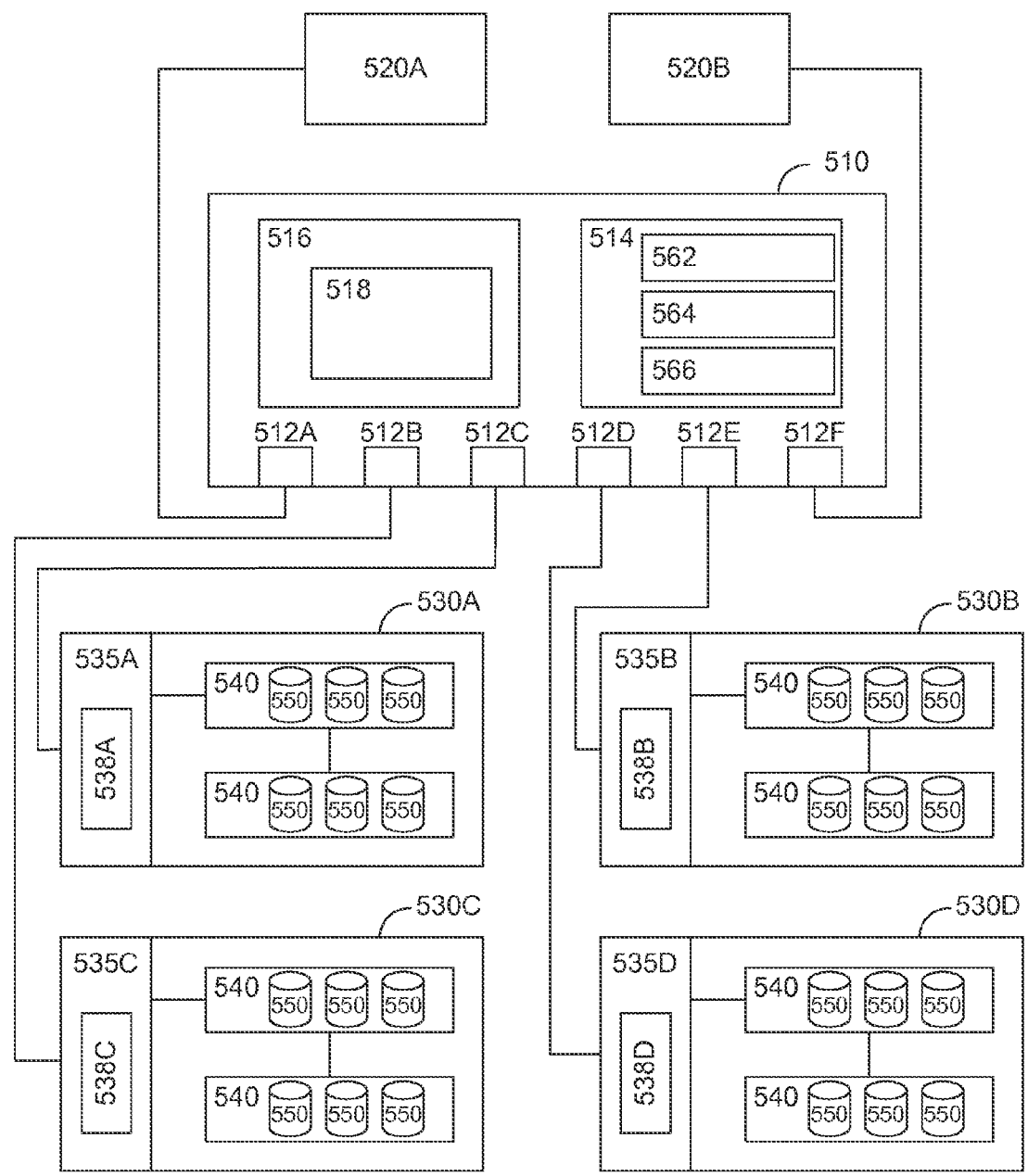
FIG. 5 is a block diagram illustrating an overall architecture of a storage system, in which the technology can be implemented in various embodiments.

FIG. 5 is a block diagram illustrating an overall architecture of a storage system, in which the technology can be implemented in various embodiments. The storage system 500 includes a storage network switch 510, multiple storage stacks 530A-530D, and multiple storage host devices 520A-520B. The storage stacks 530A-530D and storage host devices 520A-520B are interconnected via the storage network switch 510 to form the storage system 500 under a single Serial Attached SCSI (SAS) domain.

The storage network switch 510 includes multiple ports 512A-512F and a memory 516. At least one of the ports 512A-512F is capable of dynamically connecting to one of a storage host device 520A-520B and a storage stack 530A-530D. In various embodiments, any one of the ports 512A-512F is capable of dynamically connecting to host devices and storage stacks. Alternatively, a storage network switch can include some ports that are capable of dynamically connecting to storage host devices and storage stacks, as well as ports that can only connect to storage host devices and ports that can only connects to storage stacks.

The ports 512A-512F of storage network switch 510 are not fixed for a particular type of devices, e.g., the storage host devices, the storage stacks and tape devices. The switch 510 can automatically configure itself to identify and communicate with a device connected to its port, regardless of whether it is a storage host device or a storage stack. Thus, the switch 510 is flexible to change the numbers of ports being connected to the storage host devices and storage stacks, during the operation of the storage network 500. The ports can be Quad Small Form-factor Pluggable (QSFP) ports, mini-SAS ports, mini-SAS HD ports, or other types of connector ports, as would be apparent to a person having ordinary skill in the art. Although FIG. 5 illustrates items 530A-530D as storage stacks, the technology disclosed herein can apply to target end devices other than storage stacks. For instance, some of the items 530A-530D can be tape data devices. Just like the storage stacks, the storage network switch can also isolate a target end device from other target end devices and storage stacks. In other words, a storage stack can be a target end device.

The memory 516 is configured to store a routing table 518, which contains network routes to mass storage devices 550 of the storage stacks 530A-530D. The memory 516 can be a high speed memory capable of handling routing requests in a short time frame. The storage host devices 520A-520B can handle data access requests from clients, and can access the storage stacks 530A-530D via the storage network switch 510. There are multiple storage host devices 520A-520B for failover recovery and load balancing. If one of the storage host devices 520A-520B fails or is heavily loaded, other storage host devices can take over the data access tasks, as the storage host devices 520A-520B can access all storage stacks 530A-530D, e.g., via the switch 510.

At least one individual storage stack 530A-530D includes multiple storage shelves 540 and an expander 535A-535D. The storage shelves 540 in one storage stack are connected to each other in a daisy chain scheme. At least one of the storage shelves 540 includes multiple mass storage devices 550, e.g., hard disk drives, solid state drives, etc. The expander 535A-535D does not need to store routing information for other storage stacks to which it does not belong. For example, the expander 535A stores a routing table 538A that contains routing information for mass storage devices 550 of that individual storage stack 530A, but does not need to contain routing information for mass storage devices 550 associated with other storage stacks 530B-530D. As a result, the expander 535A-535D can have a routing table size significantly less than the size of the routing table 518 of the storage network switch 510. The smaller routing table size of the expander may help to speed up the configuration process by reducing the need to discover other storage stacks and allow storage network switches be placed at both end of the stacks. For instance, the number of shelves 540 can be configured according to the routing table size of the expander and therefore can help to speed up the configuration process. Because switching speeds are dependent on processor and memory speeds, expenders and switches generally use high-speed memories, which can be expensive. By using less memory (e.g., because a smaller routing table is used), the technology enables a significant cost reduction.

The storage network switch 510 is configured to dynamically identify whether a connected device is a storage host device 520A-520B or a storage stack 530A-530D, e.g., based on an identification message from the expander device 535A indicating that the device is connected to a port, for example, 512C of the storage network switch 510. The storage network switch 510 is further configured to transfer messages between the ports 512A-512F such that the storage network switch 510 prevents communications between storage stacks 530A-530D connected to the storage network switch 510, but allows communications between the storage stacks 530A-530D and the storage host devices 520A-520B connected to the storage network switch 510. In other words, the storage network switch 510 prevents communications between any two ports of the ports 512B-512E, but allows communications between any of the ports 512B-512E and ports 512A and 512F. Thus, the switch 510 can configure itself to enable communications between expanders and hosts while simultaneously isolating storage stacks.

The functionalities of the storage network switch 510 can be realized, for example, by executing instructions stored in a firmware 514 of the storage network switch 510. As a result, the storage network switch 510 isolates the storage stacks 530A-530D from each other because there are no communications between the storage stacks 530A-530D. This technology allows existing storage stacks to be used by the storage network switch without re-cabling. The current storage stack cascade shelves in a subtractive-table fashion, firmware 514 enables the table port of the storage network switch to connect to the table port of the storage stack.

For example, in various embodiments, the firmware 514 can include instructions or circuits for a recognition module 562 and a transferring module 564. The recognition module 562 is configured to identify whether a device is a storage host device 520A-520B or a storage stack 530A-530D, e.g., based on an identification message from the device indicating that the device is connected to a port 512A-512F of the storage network switch 510. The identification message can be, for example, a Serial Attached SCSI (SAS) identification frame including fields indicating whether the device is a storage host device or a storage stack. For instance, the identification message can include an IDENTIFY address frame including fields "Device Type", "Initiator Support", "Target Support", "Device Name", "SAS Address", "PHY Identifier", and "Zoning Indicator/Request". The combination of device type, initiator support and target support fields are used to derive the determination of storage host device or storage stack.

As would be recognized to one having ordinary skill in the art, other identification messages are possible. By using identification messages, the technology enables automatic identification rather than requiring manual configuration by an administrator or reservation of ports for specific device types.

The transferring module 564 is configured to transfer messages between the ports 512A-512F such that the storage network switch 510 prevents communications between storage stacks 530A-530D connected to the storage network switch 510, but allows communications between the storage stacks 530A-530D and storage host devices 520A-520B connected to the storage network switch 510. In other words, the storage network switch 510 is configured to transfer messages from one of the storage stacks, for example (e.g. 530A) to at least one of the storage host devices (e.g. 520A), but not to other storage stacks (e.g. 530B-530D). Although items 530A-530D herein are illustrated as storage stacks, the technology disclosed herein can apply to target end devices other than storage stacks. For instance, some of the items 530A-530D can be tape data devices. The transferring module can also transfer messages between ports such that the storage network switch 510 prevents communications between target end devices, but allows communications between target end devices and storage host devices.

From the perspective of an expander, for example expander 535A, the expander can "see" (e.g. exchange messages with) a switch 510 having ports 512A-512F. The expander 535A can also determine that the port 512A is connected to storage host device 520A, the port 512F is connected to storage host device 520B, and the port 512C is connected to its own storage stack 530A. However, from the perspective of expander 535A, there are no storage stacks connected to ports 512B, 512D and 512E, while actually ports 512B, 512D and 512E are respectively connected to storage stacks 535C, 535D and 535B. These determinations can be made, e.g., by querying a routing table that is dynamically updated when appropriate messages arrive from connected devices. Alternatively, these determinations can be made, e.g., by discovery of the network storage switch 510 from expander 535A.

In various embodiments, the recognition module 562 can be further configured to receive from a storage stack (e.g. storage stack 530A) network routes to mass storage devices 550 of the storage stack (e.g. storage stack 530A) if the device is a storage stack (e.g. storage stack 530A), to store the network routes into the routing table 518, and to transmit routing information to the storage stack (e.g. storage stack 530A). The routing information can include network routes to devices connected to the storage network switch 510, but not network routes to mass storage devices 550 of other storage stacks (e.g. storage stacks 530B-530D) connected to the storage network switch 510.

The storage network switch 510 can further include a broadcast module 566 configured to receive a topology update message indicating that a topology of mass storage devices 550 of a storage stack 530A-530D has been changed, and to broadcast the topology update message to the ports 512A-512F of the storage network switch 510, but not to ports 512B-512E because they are connected to storage stacks 530A-530D.

Although FIG. 5 illustrates a storage system 500 having certain numbers of ports 512A-5120E, storage host devices 520A-520B, storage stacks 530A-530, storage shelves 540, and mass storage devices 550, these numbers can be varied in various embodiments. For example, a storage system can have a storage network switch with a different number of ports, e.g. 16 ports. The numbers of storage stacks and storage host devices connected to the switch can also vary, e.g., even during the operation of the switch. Different storage stacks can contain different numbers of storage shelves. Different storage shelves can contain different numbers of mass storage devices.

For example, in various embodiments, each storage shelf can have 24 hard drives, and each storage stack can contain 10 storage shelves. In various embodiments, a storage network switch can have 16 ports, and four of the ports can be respectively connected to four storage host devices. The other 12 ports can be respectively connected to 12 storage stacks. Such a storage system can totally contain 2880

(24×10×12) hard drives. The storage network switch can include an expensive high speed memory that is large enough to store routing table for the 2880 hard drives. In contrast, the expanders in the 12 storage stacks can operate with significantly less memory (e.g. due to the size) to store routing tables for the 240 hard drive of its own storage stack. Because of the reduced memory requirement, expanders can be manufactured at less cost than if they stored a large routing table of comparable size to the storage network switch routing table.

Figure 6A:
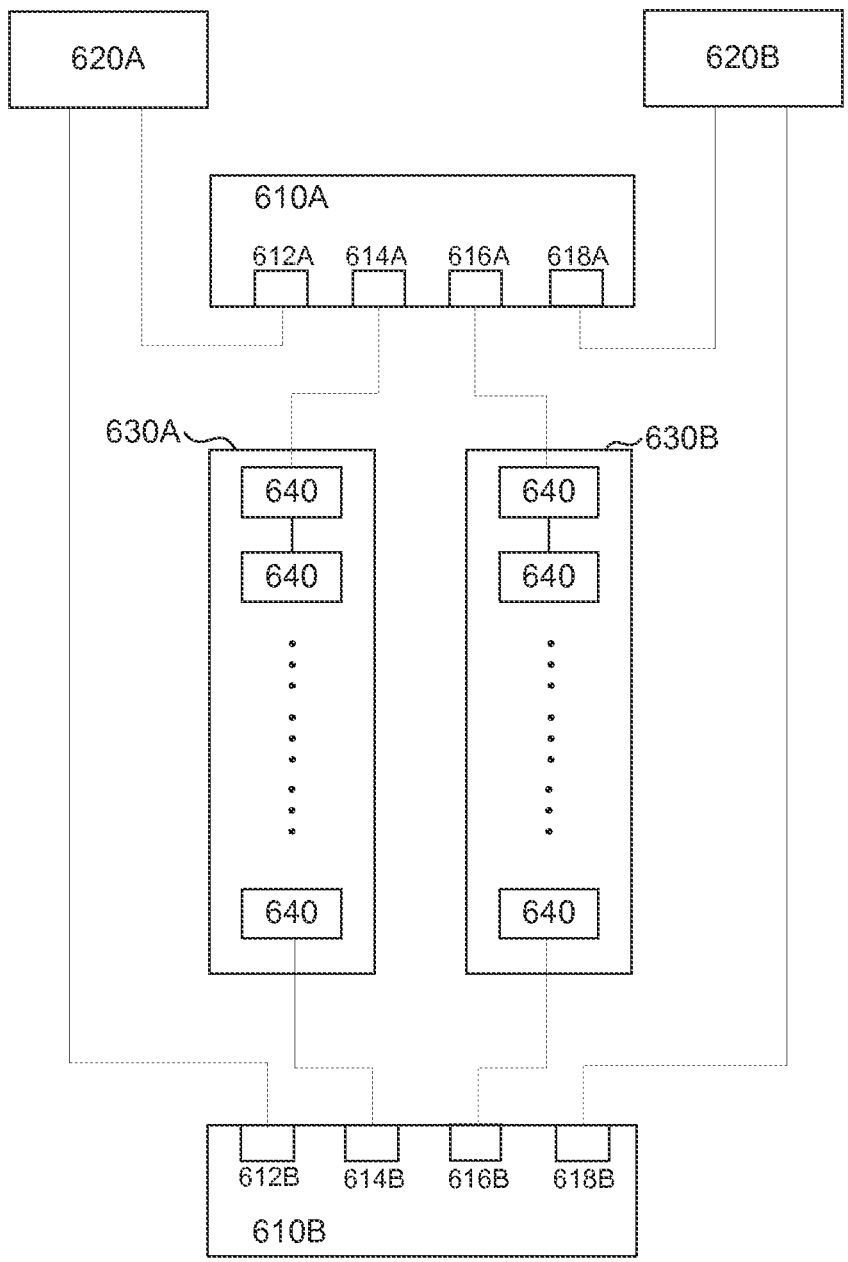
FIG. 6A is a block diagram illustrating an overall architecture of an alternative storage system with built-in redundancy, in which the technology can be implemented in various embodiments.

FIG. 6A is a block diagram illustrating an overall architecture of an alternative storage system with built-in redundancy, in which the technology can be implemented in various embodiments. The storage system 600 includes multiple storage network switches 610A-610B, multiple storage stacks 630A-630B, and multiple storage host devices 620A-620B. The storage stacks 630A-630B and storage host devices 620A-620B are interconnected via the storage network switches 610A-610B to form the storage system 600 under a single Serial Attached SCSI (SAS) domain.

For instance, the storage host device 620A can access the storage stacks 630A-630B via port 612A of switch 610A and port 612B of switch 610B. The storage host device 620B can access the storage stacks 630A-630B via port 618A of switch 610A and port 618B of switch 610B.

The storage stack 630A includes multiple storage shelves 640. For instance, the storage stack 630A can include ten storage shelves 640. The storage shelf 640 can include one or more expanders. For instance, the storage shelf 640 can include two expanders. The storage shelf 640 can further include multiple mass storage devices as illustrated in FIG. 5. The storage shelves 640 in the storage stack 630A are connected in a daisy chain scheme as illustrated in FIG. 6A. The daisy chain scheme enables multiple connections through the mass storage devices without exhausting the ports quickly. An expander of a storage shelf 640 on an end of the daisy chain connects to the port 614A of the switch 610A. An expander of another storage shelf 640 on the other end of the daisy chain connects to the port 614B of the switch 610B.

Such a configuration can provide path redundancy and "hot-plugability" (meaning that various components can be replaced or restarted without taking the system off-line). Thus, if one storage shelf 640 (e.g. a shelf 640 in stack 630A) fails or is being replaced, the other shelves within the stack can still be accessed through another data path in the storage stack.

During the operation of the storage system 600, the storage stacks 630A-630B can have topology changes and correspondingly broadcast the topology changes to the rest of the storage system 600. For example, the storage stack 630A can have a storage shelf 640 removed or added to its daisy-chain scheme. Alternatively, a mass storage device can be added or removed from a storage shelf 640 of the storage stack 630A. Accordingly, the storage stack 630A can broadcast a topology update message via the connected expander. The topology update message indicates that a topology of mass storage devices of the storage stack 630A has been changed.

When a storage network switch, e.g., switch 610A, receives the topology update message, the switch sends the message to ports connected to storage host device 620A (e.g. port 612A), but not to the ports connected to other storage stacks (e.g., port 616A in FIG. 6A). Similarly to the switch 510 in FIG. 5, the switches 610A-610B prevent the communications between any two storage stacks by preventing transferring of messages from one storage stack to another storage stack. This functionality prevents messages (e.g. the topology update message) from propagating in loops, which is not allowed in Serial Attached SCSI (SAS).

If the switches 610A-610B do not prevent transferring messages from one storage stack to another storage stack, the messages can propagate in loops in the storage system 600. For example, suppose a topology update message is sent from an expander of a storage shelf 640 of the storage stack 630A to the port 614A of switch 610A. Without the restriction, the switch 610A broadcasts the message to both ports 612A and 616A. Accordingly, the message propagates to the storage stack 630B via the port 616A and an expander in a storage shelf 640 at one end of the daisy chain in storage stack 630B. The message travels through the storage shelves 640 in a daisy chain and is broadcasted by another expander in a storage shelf 640 at the other end of the daisy chain in storage stack 630B to the port 616B of switch 610B. Without the restriction, the switch 610B broadcasts the message to both ports 612B and 614B. Accordingly, the message is broadcasted back to the storage stack 630A via the port 614B and an expander in a storage shelf 640 at one end of the daisy chain in storage stack 630A. Therefore, the messages can propagate in loops, if the switches 610A-610B do not prevent transferring messages between ports being connected to storage stacks.

Furthermore, because there are no direct communications between the storage stacks 630A-630B, the expanders of the storage shelves 640 in the storage stacks 630A-630B need not keep routing information for storage devices of other storage stacks. For example, the routing tables in expanders in storage stack 630A need not record information of network routes to storage devices of storage stack 630B. In contrast, the switches 610A-610B need to maintain routing information for the storage devices in storage stacks 630A-630B (e.g., to determine to which storage stack to route a message). Therefore, the expanders in their respective storage stack can have routing tables that are significantly smaller than the routing tables of the switches 610A-610D.

The storage components (e.g. memory) in the switches 610A-610B and the expanders in storage shelves 640 for storing the routing tables require a high access speed because the lookups in the routing tables need to be sufficiently fast for transferring messages without significant delays. These high-access-speed storage components can be costly. The expanders in storage shelves 640 can use less expensive (or at least fewer high-access-speed) storage components, since they require routing table sizes significantly less than the routing table sizes of the switches 610A-610B and handle less traffic than switches. This arrangement can significantly reduce the overall cost of the storage system 600. The smaller routing table size of the expander helps to speed up the configuration process by reducing the need to discover other storage stacks and allow storage network switches be placed at both ends of the stacks.

Figure 6B:
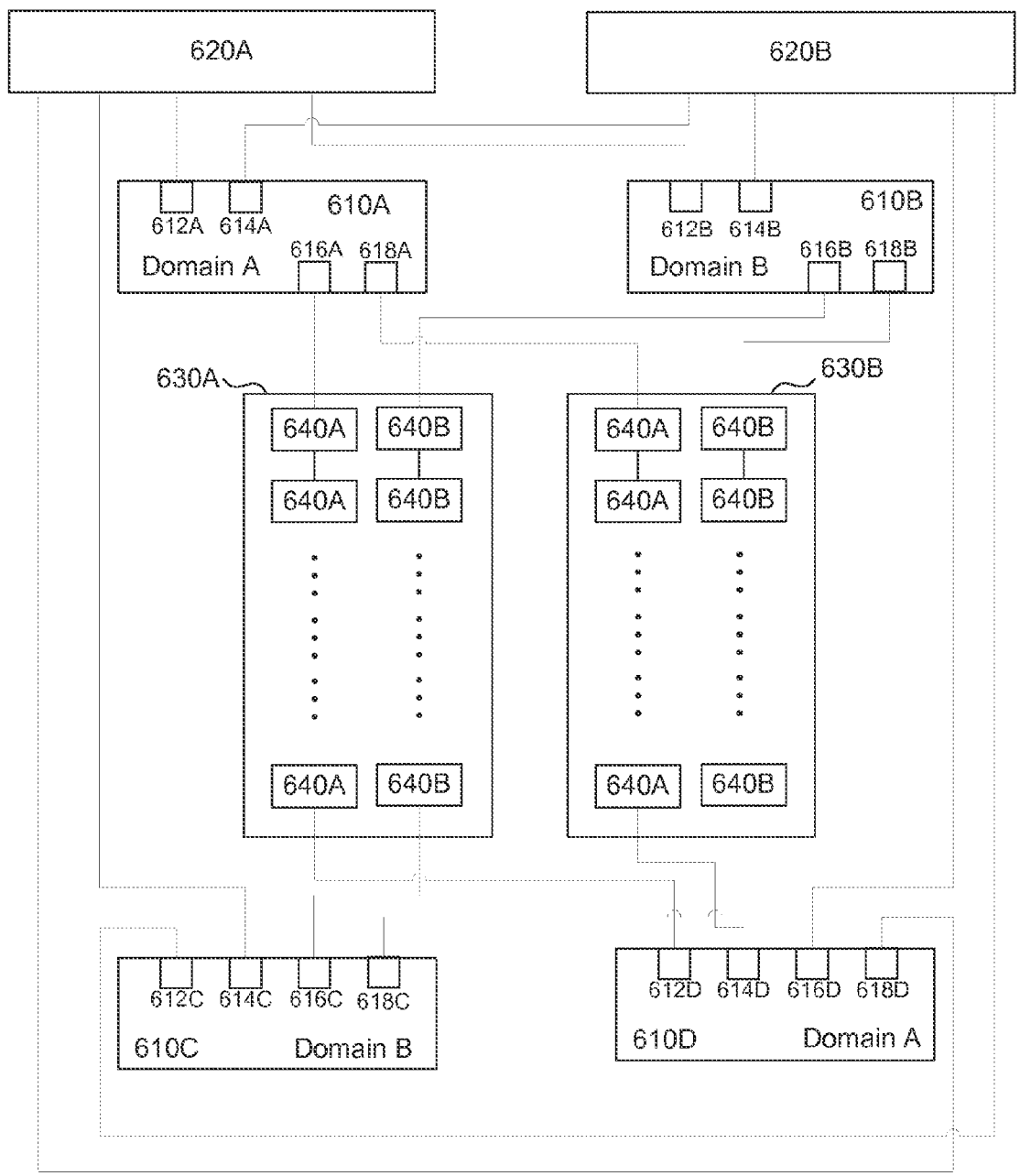
FIG. 6B is a block diagram illustrating an overall architecture of a storage system containing two domains, in which the technology can be implemented in various embodiments.

Similarly, a storage system can include storage network switches and storage stacks to form more than one domain. FIG. 6B is a block diagram illustrating an overall architecture of a storage system containing two domains, in which the technology can be implemented in various embodiments. The storage system 600 in FIG. 6B includes multiple storage network switches 610A-610D, multiple storage stacks 630A-630B, and multiple storage host devices 620A-620B. The storage stacks 630A-630D and storage host devices 620A-620B are interconnected via the storage network switches 610A-610D to form two storage domains (e.g., Serial Attached SCSI domains). As shown in FIG. 6B, the storage network switches 610A and 610D and daisy chains of storage shelves 640A form domain A. The storage network switches 610B and 610C and daisy chains of other storage shelves 640B form domain B.

Ports 612A, 614A, 612B, 614B, 612C, 614C, 616D and 618D are connected to the storage host devices 620A and 620B. Ports 616A, 618A, 616B, 618B, 616C, 618C, 612D and 614D are connected to the storage stacks 630A and 630B. Some of the ports can be capable of dynamically connecting to one of a storage host device 620A-620B and a storage stack 630A-630B. In various embodiments, any one of the ports 612A, 614A, 612B, 614B, 612C, 614C, 616D, 618D, 616A, 618A, 616B, 618B, 616C, 618C, 612D and 614D is capable of dynamically connecting to host devices and storage stacks. Alternatively, a storage network switch can include some ports that are capable of dynamically connecting to storage host devices and storage stacks, as well as ports that can only connect to storage host devices and ports that can only connects to storage stacks.

Processes of Stack Isolation by Storage Network Switches

Figure 7:
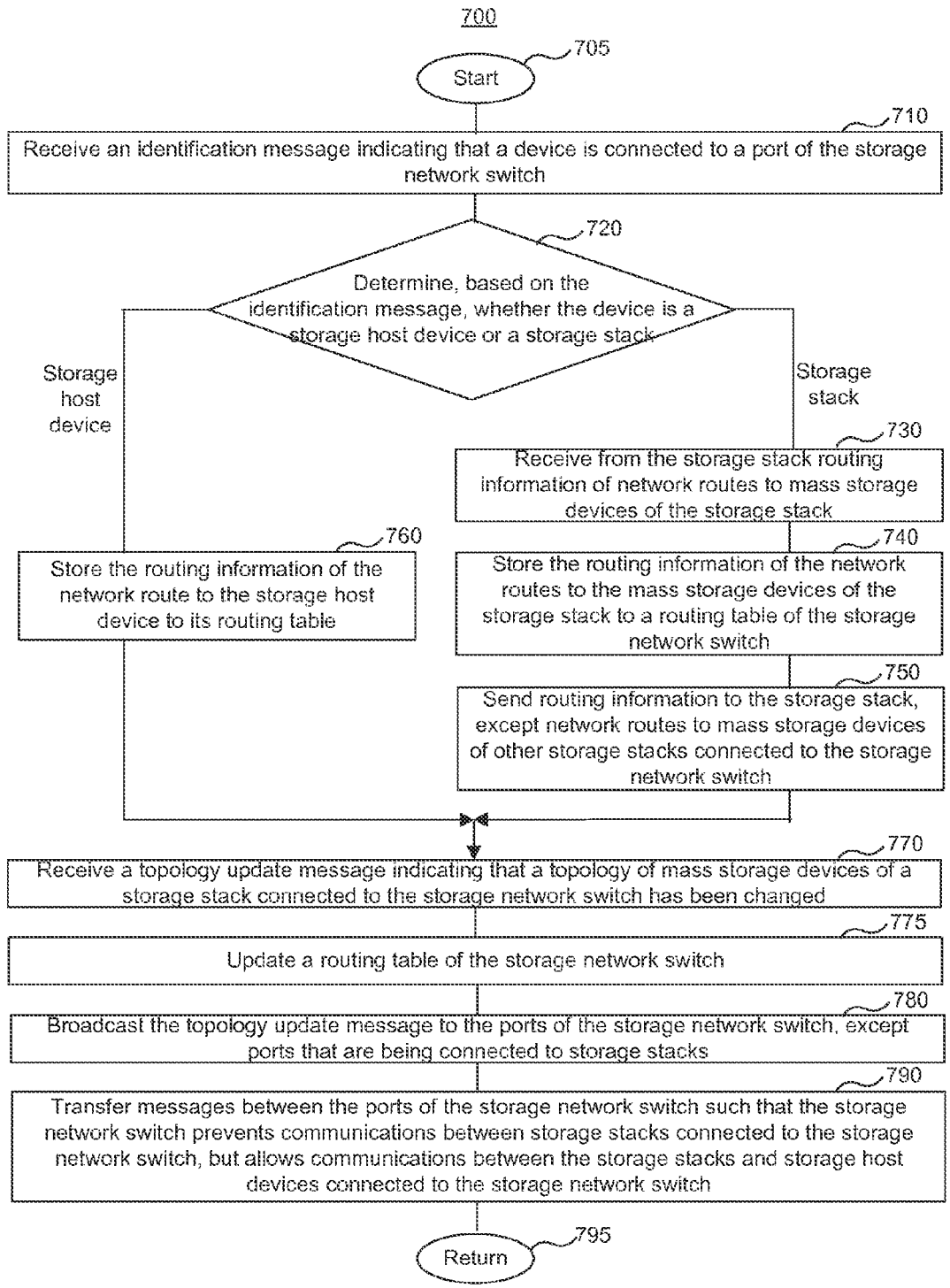
FIG. 7 is a flow diagram illustrating a process for stack isolation in a storage system, in various embodiments.

FIG. 7 is a flow diagram illustrating a process 700 for stack isolation in a storage system, in various embodiments. The storage system can include at least one storage network switch, multiple storage stacks, and multiple storage host devices. The storage network switch is designed to interconnect the storage stacks and storage host devices to form the storage system under a single Serial Attached SCSI (SAS) domain. At least one individual storage stack includes multiple storage shelves and an expander. The storage shelves are connected to each other in a daisy chain scheme. At least one of the storage shelves includes multiple mass storage devices. The storage network switch includes multiple ports and at least one of the ports is configured to dynamically connect to a device that can be either a storage host device or a storage stack.

The process 700 starts at 705. At block 710 of the process 700, the storage network switch receives an identification message indicating that a device is connected to a port of the storage network switch. The identification message can be sent by an expander device ("expander") of a storage stack. Alternatively, the identification message can be sent by a host device or a target end device. The expander is configured to handle communications between the storage stack and the storage network switch.

The expander stores a routing table, e.g., listing network routes to mass storage devices of the storage stack to which the expander belongs, but not network routes to mass storage devices of other storage stacks (e.g., to which the expander does not belong) connected to the storage network switch. The expander can have a routing table size less than a routing table size of the storage network switch. The storage network switch's routing table contains routing information for accessing mass storage devices in storage stacks connected to the storage network switch. In contrast, the routing table size of the expander can be less than the number of mass storage devices in the storage stacks connected to the storage network switch.

At decision block 720, the storage network switch determines, based on the identification message, whether the connected device is a storage host device or a storage stack. For example, the identification message can be a Serial Attached SCSI (SAS) identification frame including fields indicating whether the device is a storage host device or a storage stack. The storage network switch can automatically read such fields from the identification message in order to determine a device type of the connected device, without the need of manual configuration by an administrator or reservation of ports for specific device types. Storage stack is used as an example in the process 700, the storage network switch can also determine whether the connected device is a target end device. The technology disclosed herein can apply to target end devices other than storage stacks.

If the device is a storage stack, the process continues at block 730, where the storage network switch receives from the storage stack routing information of network routes to mass storage devices of the storage stack. Continuing at block 740, the storage network switch stores the routing information of the network routes to the mass storage devices of the storage stack, e.g., in a routing table of the storage network switch. Then at block 750, the storage network switch sends routing information to the storage stack. In various embodiments, the storage network switch sends routing information to the storage stack upon receiving a request from the connected entity, e.g., the storage stack. The routing information includes network routes to devices connected to the storage network switch, but not network routes to mass storage devices of other storage stacks connected to the storage network switch.

If at decision block 720 the device is a storage host device, the process 700 continues at block 760, where the storage network switch stores the routing information of the network route to the storage host device, e.g., in its routing table.

Continuing at block 770, the storage network switch receives a topology update message indicating that a topology of mass storage devices of a storage stack connected to the storage network switch has been changed. The topology update message can be received from a storage stack connected to the storage network switch, a storage host device connected to the storage network switch, or a different storage network switch. At block 775, the storage network switch updates a routing table of the switch. At block 780, the storage network switch broadcasts the topology update message to the ports of the storage network switch, but not to ports that are being connected to storage stacks.

At block 790, the storage network switch transfers messages between the ports of the storage network switch such that the storage network switch prevents communications between storage stacks connected to the storage network switch, but allows communications between the storage stacks and storage host devices connected to the storage network switch. At block 795, the process 700 returns.

Those skilled in the art will appreciate that the logic illustrated in FIG. 7 and described above, and in each of the flow diagrams discussed below, may be altered in a variety of ways. For example, the order of the logic may be rearranged, substeps may be performed in parallel, illustrated logic may be omitted, other logic may be included, etc. For example, a process separate from the process 700 can include substeps of the blocks 770-790.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the disclosed technology is not limited except as by the appended claims.

What is claimed is:
1. A method, comprising:
receiving, by a computing device, an identification message indicating that a device is connected to a port of a storage network switch;

automatically determining, by the computing device, a type of the device based on the identification message received, wherein the type of the device comprises a storage controller device and a storage sub system, wherein the storage network switch includes multiple ports and at least one of the ports is configured to dynamically connect to the device, wherein the received identification message comprises a serial attached small computer system interface (SCSI) frame comprising a device type data field, an initiator support data field, and a target support data field, and wherein a storage host device and a storage stack is determined based on the determined type of the device, the initiator support data field and the target support data field; and transferring, by the computing device, messages between the multiple ports such that the storage network switch prevents communications between a first and a second storage sub-systems connected to the storage network switch, but allows communications between each of the first and the second storage sub-systems and the storage controller device connected to the storage network switch when the device is determined to be the storage controller device.

2. The method of claim 1, wherein the determining comprises:
determining, by the computing device, the type of the device based on the identification message received at the storage network switch when the device is the a target end device.

3. The method of claim 1, further comprising:
sending, by the computing device, routing information to the storage sub-system when the connected device is a third storage sub-system, wherein the routing information includes network routes to the device connected to the storage network switch, but not network routes to mass storage devices of the first and the second sub-systems connected to the storage network switch.

4. The method of claim 1, further comprising:
receiving, by the computing device, a topology update message indicating that a topology of mass storage devices of a storage sub-system connected to the storage network switch has been changed; and
broadcasting, by the computing device, the topology update message to the ports of the storage network switch, but not to ports connected to the first or the second storage sub-systems.

5. The method of claim 4, wherein the topology update message is received from a storage sub-system connected to the storage network switch.

6. The method of claim 1, wherein mass storage devices of storage sub-systems connected to the storage network switch form a Serial Attached SCSI (SAS) domain via the storage network switch.

7. The method of claim 1, further comprising:
receiving, by the computing device, from a third storage sub-system routing information of network routes to mass storage devices of the third storage sub-system when the connected device is a third storage sub-system.

8. The method of claim 7, further comprising:
storing, by the computing device, the routing information of the network routes to the mass storage devices of the third storage sub-system to a routing table of the storage network switch, wherein the storage network switch has a routing table listing network routes to mass storage devices of the first, the second and the third storage sub-systems.

9. The method of claim 1, wherein each of the first, the second and the third storage sub-systems includes multiple storage shelves being connected to each other in a daisy chain scheme, and at least one of the storage shelves includes multiple mass storage devices.

10. A non-transitory computer readable medium having stored thereon instructions for stack isolation comprising executable code which when executed by a processor, causes the processor to perform steps comprising:
receiving an identification message indicating that a device is connected to a port of a storage network switch;
automatically determining a type of the device based on the identification message received, wherein the type of the device comprises a storage controller device and a storage sub system, wherein the storage network switch includes multiple ports and at least one of the ports is configured to dynamically connect to the device, wherein the received identification message comprises a serial attached small computer system interface (SCSI) frame comprising a device type data field, an initiator support data field, and a target support data field, and wherein a storage host device and a storage stack is determined based on the determined type of the device, the initiator support data field and the target support data field; and
transferring messages between the multiple ports such that the storage network switch prevents communications between a first and a second storage sub-systems connected to the storage network switch, but allows communications between each of the first and the second storage sub-systems and the storage controller device connected to the storage network switch when the device is determined to be the storage controller device.

11. The medium as set forth in claim 10 wherein the determining further comprises determining based on the identification message received at the storage network switch when the device is a target end device.

12. The medium as set forth in claim 10 further comprising sending routing information to the storage sub-system when the connected device is a third storage sub-system, wherein the routing information includes network routes to the device connected to the storage network switch, but not network routes to mass storage devices of the first and the second storage sub-systems connected to the storage network switch.

13. The medium as set forth in claim 10 further comprising:
receiving a topology update message indicating that a topology of mass storage devices of a storage sub-system connected to the storage network switch has been changed; and
broadcasting the topology update message to the ports of the storage network switch, but not to ports connected to the first or the second storage sub-systems.

14. The medium as set forth in claim 13 wherein the topology update message is received from a storage sub-system connected to the storage network switch, a storage controller device connected to the storage network switch.

15. The medium as set forth in claim 10 wherein mass storage devices of storage sub-systems connected to the storage network switch form a Serial Attached SCSI (SAS) domain via the storage network switch.

16. The medium as set forth in claim 10 further comprising receiving from a third storage sub-system routing information of network routes to mass storage devices of the third storage sub-system when the connected device is a third storage sub-system.

17. The medium as set forth in claim 16 further comprising storing the routing information of the network routes to the mass storage devices of the third storage sub-system to a routing table of the storage network switch, wherein the storage network switch has a routing table listing network routes to mass storage devices of the first, the second and the third storage sub-systems.

18. The medium as set forth in claim 10 wherein each of the first, the second and the third storage sub-systems includes multiple storage shelves being connected to each other in a daisy chain scheme, and at least one of the storage shelves includes multiple mass storage devices.

19. A computing device switch comprising:
a processor;
a memory coupled to the processor which is configured to be capable of executing programmed instructions comprising and stored in the memory to:
receive an identification message indicating that a device is connected to a port of the storage network switch;
automatically determine a type of the device based on the identification message received, wherein the type of the device comprises a storage controller device and a storage sub system, wherein the storage network switch includes multiple ports and at least one of the ports is configured to dynamically connect to the device, wherein the received identification message comprises a serial attached small computer system interface (SCSI) frame comprising a device type data field, an initiator support data field, and a target support data field, and wherein a storage host device and a storage stack is determined based on the determined type of the device, the initiator support data field and the target support data field; and
transfer messages between the multiple ports such that the storage network switch prevents communications between a first and a second storage sub-systems connected to the storage network switch, but allows communications between each of the first and the second storage sub-systems and the storage controller device connected to the storage network switch when the device is determined to be the storage controller device.

20. The device as set forth in claim 19 wherein the processor coupled to the memory is further configured to be capable of executing at least one additional programmed instruction comprising and stored in the memory for the determining further comprises determine based on the identification message received at the storage network switch when the device is a target end device.

21. The device as set forth in claim 19 wherein the processor coupled to the memory is further configured to be capable of executing at least one additional programmed instruction comprising and stored in the memory to send routing information to the storage sub-system when the connected device is a third storage sub-system, wherein the routing information includes network routes to the device connected to the storage network switch, but not network routes to mass storage devices of the first and the second storage sub-systems connected to the storage network switch.

22. The device as set forth in claim 19 wherein the processor coupled to the memory is further configured to be capable of executing at least one additional programmed instruction comprising and stored in the memory to:
receive a topology update message indicating that a topology of mass storage devices of a storage sub-system connected to the storage network switch has been changed; and
broadcast the topology update message to the ports of the storage network switch, but not to ports connected to the first or the second storage sub-systems.

23. The device as set forth in claim 22 wherein the topology update message is received from a storage sub-system connected to the storage network switch, a storage controller device connected to the storage network switch.

24. The device as set forth in claim 19 wherein mass storage devices of storage sub-systems connected to the storage network switch form a Serial Attached SCSI (SAS) domain via the storage network switch.

25. The device as set forth in claim 19 wherein the processor coupled to the memory is further configured to be capable of executing at least one additional programmed instruction comprising and stored in the memory to receive from a third storage sub-system routing information of network routes to mass storage devices of the third storage sub-system when the connected device is a third storage sub-system.

26. The device as set forth in claim 25 wherein the processor coupled to the memory is further configured to be capable of executing at least one additional programmed instruction comprising and stored in the memory to store the routing information of the network routes to the mass storage devices of the third storage sub-system to a routing table of the storage network switch, wherein the storage network switch has a routing table listing network routes to mass storage devices of the first, the second and the third storage sub-systems.

27. The device as set forth in claim 19 wherein each of the first, the second and the third storage sub-systems includes multiple storage shelves being connected to each other in a daisy chain scheme, and at least one of the storage shelves includes multiple mass storage devices.

* * * * *